United States Patent [19]

Usuda

[11] Patent Number: 5,399,869
[45] Date of Patent: Mar. 21, 1995

[54] PHOSWICH DETECTORS HAVING OPTICAL FILTER FOR CONTROLLING PULSE HEIGHT AND RISE TIME OF OUTPUT FROM SCINTILLATOR

[75] Inventor: Shigekazu Usuda, Ibaraki, Japan

[73] Assignee: Japan Atomic Energy Research Institute, Tokyo, Japan

[21] Appl. No.: 132,959

[22] Filed: Oct. 7, 1993

[30] Foreign Application Priority Data

Oct. 9, 1992 [JP] Japan .................................. 4-271917

[51] Int. Cl.⁶ .............................................. G01T 1/20
[52] U.S. Cl. .................. 250/486.1; 250/367; 250/368; 250/487.1
[58] Field of Search ............... 250/486.1, 487.1, 488.1, 250/367, 366, 368, 390.11

[56] References Cited

U.S. PATENT DOCUMENTS

| | | | |
|---|---|---|---|
| 2,910,592 | 10/1959 | Armistead | 250/367 |
| 3,892,971 | 7/1975 | Arthur et al. | 250/368 |
| 3,967,122 | 6/1976 | Ashe et al. | 250/368 |
| 4,958,080 | 9/1990 | Melcher | 250/483.1 |
| 5,149,971 | 9/1992 | McElhaney et al. | 250/361 R |

FOREIGN PATENT DOCUMENTS

| | | | |
|---|---|---|---|
| 188869 | 9/1985 | Japan | 250/367 |
| 247890 | 3/1990 | Japan | 250/367 |

OTHER PUBLICATIONS

Usuda, Shigekasu, "Development of ZnS(Ag)-/NE102A and ZnS(Ag)/Stilbene Phoswich Detector for Simultaneous a and B(Y) Counting.", Journal of Nuclear Science and Technology, vol. 29, Sep. 1992. pp. 927–929.

*Primary Examiner*—Carolyn E. Fields
*Attorney, Agent, or Firm*—Browdy & Neimark

[57] ABSTRACT

A phoswich detector having two or more scintillators is disclosed, in which at least one optical filter is provided between the scintillator farthest from a photomultiplier and the scintillator nearest to the photomultiplier. The detector is capable of reducing the pulse height of signal from the scintillator to an arbitrary level and extending the rise time of the pulse to some extent.

13 Claims, 3 Drawing Sheets

PHOSWICH DETECTORS HAVING OPTICAL FILTER FOR CONTROLLING PULSE HEIGHT AND RISE TIME OF OUTPUT FROM SCINTILLATOR

FIELD OF THE INVENTION

This invention relates to a phoswich detector in which the pulse height and the rise time of the scintillator output can be controlled by optical filters.

BACKGROUND OF THE INVENTION

In so-called phoswich detectors having two or more scintillators, the pulse height of the signal from each scintillator differs greatly from each other in some cases. For example, where $\alpha$-rays and $\beta$-(including $\gamma$-)rays are counted by means of a combination of a ZnS(Ag) scintillator and a BGO (bismuth germanate, $Bi_4Ge_3O_{12}$) scintillator, an NE 102A scintillator (produced by NE Technology Co., G.B.), a BC400 scintillator (produced by Bicron Co., U.S.A.) or an NaI(Tl) scintillator, the ZnS(Ag) scintillator forms a large pulse height due to its high sintillation intensity whereas the BGO scintillator, etc. form a small pulse height due to their lower scintillation intensity than ZnS(Ag). This being the case, it is necessary to adjust the difference in pulse height between the scintillators. For example, it is possible to adjust the pulse height to some extent within a dynamic range by using a complicated electronic circuit and various expensive modules.

However, it is considerably difficult in principle to adjust the pulse height from each scintillator by means of an electronic circuit. In addition, it is impossible to adjust the rise time of an output pulse From each scintillator only by means of an electronic circuit.

SUMMARY OF THE INVENTION

In the light of the above-mentioned circumstances, an object of the present invention is to provide a phoswich detector in which the pulse height of the scintillator output can be reduced to an arbitrary level and the rise time of the pulse can be delayed to some extent without using a complicated and expensive electronic circuit.

Another object of the present invention is to provide a phoswich detector which is capable of pulse height and pulse shape discrimination.

In order to accomplish the above-mentioned object, the present inventors have conducted extensive investigations on a phoswich detector having two or more scintillators, and as a result, found that (1) the pulse height can be controlled by reducing transmitted of scintillation with an optical filter and (2) the rise time can be changed by selecting transmission wavelength of an optical filter. The present invention has been completed based on these findings.

That is, the present invention provides a phoswich detector having two or more scintillators, in which at least one optical filter is provided between the scintillator farthest from a photomultiplier and the one nearest to the photomultiplier.

DETAILED DESCRIPTION OF THE INVENTION

Figure 1:
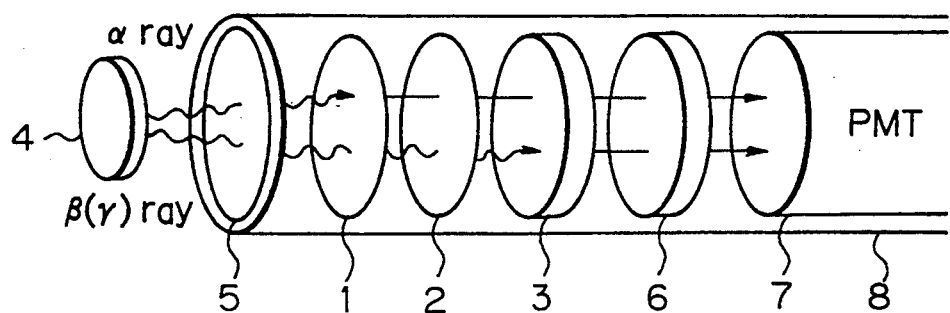
FIG. 1 illustrates a schematic view of the phoswich detector according to the present invention.

According to the present invention in a phoswich detector having two or more scintillators, an optical filter is provided between the scintillator farthest from a photomultiplier and the one nearest to the photomultiplier, whereby the transmittance of scintillation from the scintillator disposed at a position farther from the photomultiplier than the optical filter is suppressed moderately, or the scintillation is trapped by the optical filter to reduce the pulse height or delay the rise time.

The number of scintillators in one phoswich detector is not particularly limited as long as it is two or more and is selected according to the kind of radiation to be measured. However, as the number of scintillators increases, the data obtained are the more difficult to analyze. A suitable number of scintillators is 3, and preferably 2. In the present invention, a phoswich detector having two scintillators is advantageous from the viewpoint of detection sensitivity, resolving power, and operation simplicity.

According to one embodiment of the present invention, a phoswich detector having two scintillators has an optical filter provided between the two scintillators. According to another embodiment, a phoswich detector having three scintillators has an optical filter between the scintillator farthest from a photomultiplier (i.e., the nearest to a radiation source) and the middle one or between the middle scintillator and the one nearest to the photomultiplier.

Being set as described above, the optical filter moderately controls the transmittance of the fluorescence from the scintillator farther from the optical filter (i.e., nearer to the radiation source) or traps the fluorescence from that scintillator. As a result, the pulse height of the signal from that scintillator is reduced, or the rise time of the pulse can be delayed.

In still another embodiment of the present invention, an optical filter may be set both between the scintillator farthest from a photomultiplier and the middle one and between the middle one and the one nearest to the photomultiplier.

In a further embodiment, two or more optical filters may be inserted between two adjacent scintillators.

In order to reduce the pulse height, it is desirable to use an optical filter which functions to reduce the transmittance of the fluorescence emitted from a scintillator. In this case, the optical filter to be used preferably has a constant transmittance to the wavelength over the region to which the photomultiplier used has sensitivity. Such an optical filter useful in the present invention includes various ND filters and a gold-coated polyethylene terephthalate, e.g. Mylar TM film. Because the pulse height from a scintillator is proportional to the transmittance of the optical filter, the pulse height can be controlled with ease by appropriately adjusting the transmittance of the optical filter. Therefore, the pulse height of different kinds of radiation, e.g., $\alpha$-rays and β(γ)-rays, can be adjusted within a given dynamic range.

On the other hand, in order to delay the rise time of output pulses, it is desirable to use an optical filter capable of reducing the transmittance of only the light in the shorter wavelength side of the fluorescence emitted from a scintillator, i.e., an optical filter capable of transmitting only the light in the longer wavelength side. In this case, according as the threshold transmission wavelength of the optical filter becomes longer, the rise time is delayed more, but in turn, fluctuations become more pronounced. Taking these tendencies into consideration, it is desired to select an optical filter having a moderate threshold transmission wavelength. Such an optical filter useful in the present invention includes sharp-cut filters. In using, for instance, a ZnS(Ag) scintillator having a maximum emission wavelength of 450 nm, it is preferable to use an optical filter whose threshold transmission wavelength ranges from about 360 to 480 nm for delay of the rise time of the output pulse from the scintillator.

It is possible to obtain both of the above-described effects of the present invention, i.e., a reduction in pulse height and delay of the rise time of the output pulse by using an optical filter which functions to reduce the transmittance of fluorescence and also functions to reduce the transmittance of shorter wavelength light or by using a combination of an optical filter which functions to reduce the transmittance of fluorescence and an optical filter which functions to reduce the transmittance of shorter wavelength light.

While the distance between a scintillator and an optical filter is not particularly limited, it is preferable to arrange them in contact with one another so as to avoid deflection or total reflection of the fluorescence.

According to the present invention, it is possible to control the height and the rise time of the output pulse from a scintillator positioned farther from an optical filter, i.e., nearer to a radiation source. As a result, there are provided advantages such that: (1) radiation measurement with a phoswich detector can be carried out with a simple detection system; (2) no complicated circuit is needed thereby simplifying the method of setting and adjustment; (3) accordingly, problems can be reduced, and the cost is reduced; and (4) the equipment can be reduced in size.

The present invention will now be illustrated in greater detail with reference to Examples, but should not be construed as being limited thereto.

EXAMPLE 1

Control of Extremely Different Pulse Height

A phoswich detector having the structure shown in FIG. 1 was assembled. The phoswich detector had ZnS(Ag) scintillator 1 farther from photomultiplier 7, BGO scintillator 3 nearer to photomultiplier 7, and gold-coated Mylar TM film 2 inserted between scintillators 1 and 3. On the radiation source 4 side of ZnS(Ag) scintillator 1 is placed light-shielding window 5 made of aluminum-coated Mylar TM film, and between BGO scintillator 3 and photomultiplier 7 is arranged optical glass 6 for light guide to photomultiplier 7. All these elements were put in photomultiplier housing 8.

As radiation source 4, $^{244}$Cm (source of α-rays) and $^{137}$Cs (source of β(γ)-rays) were used.

Figure 2:
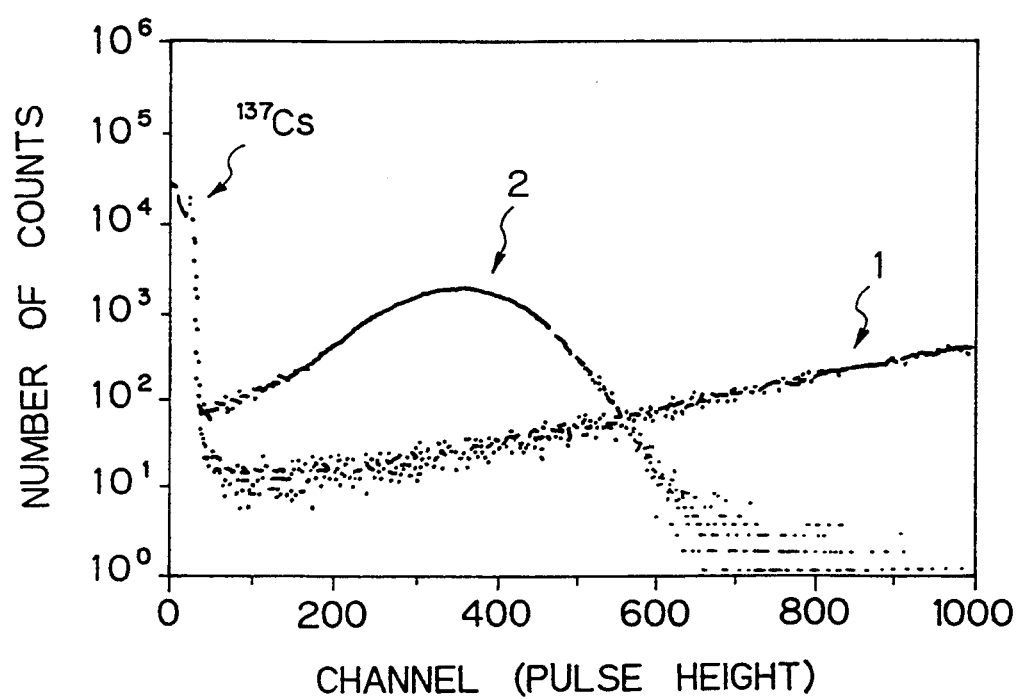
FIG. 2 is pulse height distribution of $\alpha$-rays from $^{244}$Cm and that of $\beta(\gamma)$-rays from $^{137}$Cs as measured with a phoswich detector.
Figure 3:
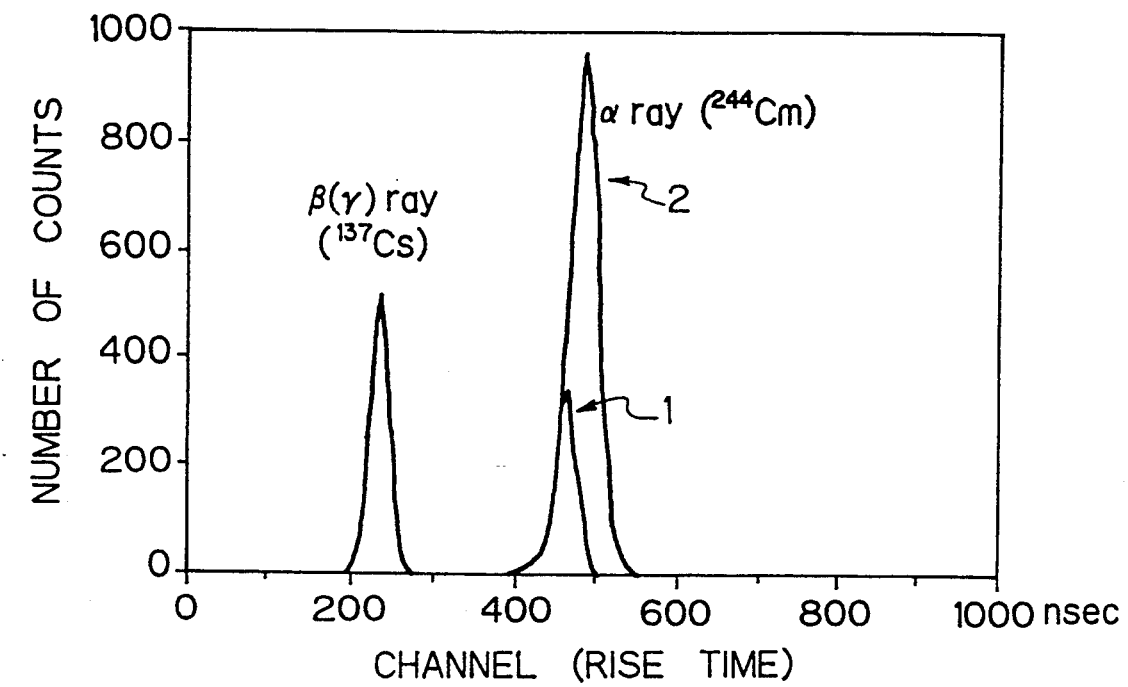
FIG. 3 is rise time distributions of $\alpha$-rays from $^{244}$Cm and that of $\beta(\gamma)$-rays from $^{137}$Cs as measured with a phoswich detector.

At first, a measurement was made with the phoswich detector without gold-coated Mylar TM film 2. As a result, where the gain of the amplifier was set so that α(γ)-rays from $^{137}$Cs may be counted with BGO scintillator 3, the pulse height of α-rays from $^{244}$Cm as counted with ZnS(Ag) scintillator 1 was too high to saturation unless a special circuit was provided, resulting in the failure of proper counting. Plot 1 in FIG. 2 shows a pulse height distribution (energy spectrum) obtained in the above case, and plot 1 in FIG. 3 shows a rise time distribution (rise time spectrum) obtained simultaneously.

Then, the same measurement was conducted with gold-coated Mylar TM film 2 being arranged between the two scintillators. The transmittance of gold-coated Mylar TM film 2 was about 13%. As shown in FIG. 1, α-rays and β(γ)-rays (shown by dotted lines) from radiation source 4 passed light-shielding window 5 and entered ZnS(Ag) scintillator 1. Whereupon ZnS(Ag) scintillator 1 emitted fluorescence by interacting α-rays, but β(γ)-rays passed through the ZnS(Ag) scintillator 1 as such. The pulse height of the signal from ZnS(Ag) scintillator 1 was adjusted by lowering the fluorescence with optical filter 2 (a gold-coated Mylar TM film). Then, BGO scintillator 3 emitted fluorescence by interacting β(γ)-rays. Both the fluorescence from ZnS(Ag) scintillator 1 and that from BGO scintillator 3 passed through light guide 6 and entered photomultiplier 7. Plot 2 in FIG. 2 depicts the pulse height distribution of α-rays adjusted by optical filter 2, and plot 2 in FIG. 3 shows the rise time distribution obtained simultaneously. As is apparent from these results, use of the gold-coated Mylar TM brought about no change in the pulse height and rise time distributions of β(γ)-rays. On the other hand, the pulse height of α-rays was reduced to adjust within the dynamic range of α(γ)-rays (the gain of the amplifier was the same as in the case of using no optical filter). Thus, a reduction in counting efficiency in the rise time distribution of α-rays could be avoided, and a high resolution between α-rays and β(γ)-rays could be maintained.

EXAMPLE 2

Application to Pulse Height Discrimination

Example 2 is to illustrate an experiment of pulse height discrimination of only thermal neutrons by the use of a phoswich detector containing a ZnS(Ag) scintillator for α-ray measurement and a $^6$Li concentrated lithium glass scintillator which is highly sensitive to thermal neutrons.

α-Rays and thermal neutrons in a solution were measured by using α-rays from $^{244}$Cm and thermal neutrons from $^{252}$Cf moderated by paraffin. β(γ)-rays from the $^{252}$Cf radiation source were removed to some extent by shielding with lead.

When measured with the phoswich detector having no optical filter, the pulse height of α-rays from the ZnS(Ag) scintillator was larger than that of the thermal neutrons from the $^6$Li concentrated lithium glass scintillator. As far as a sample to be measured is solid, pulse height discrimination can be done to some extent with such a difference in pulse height. With a liquid sample as in this example, however, the pulse height of α-rays was reduced due to self-absorption and coincided with that of thermal neutrons, making pulse height discrimination impossible.

Figure 4:
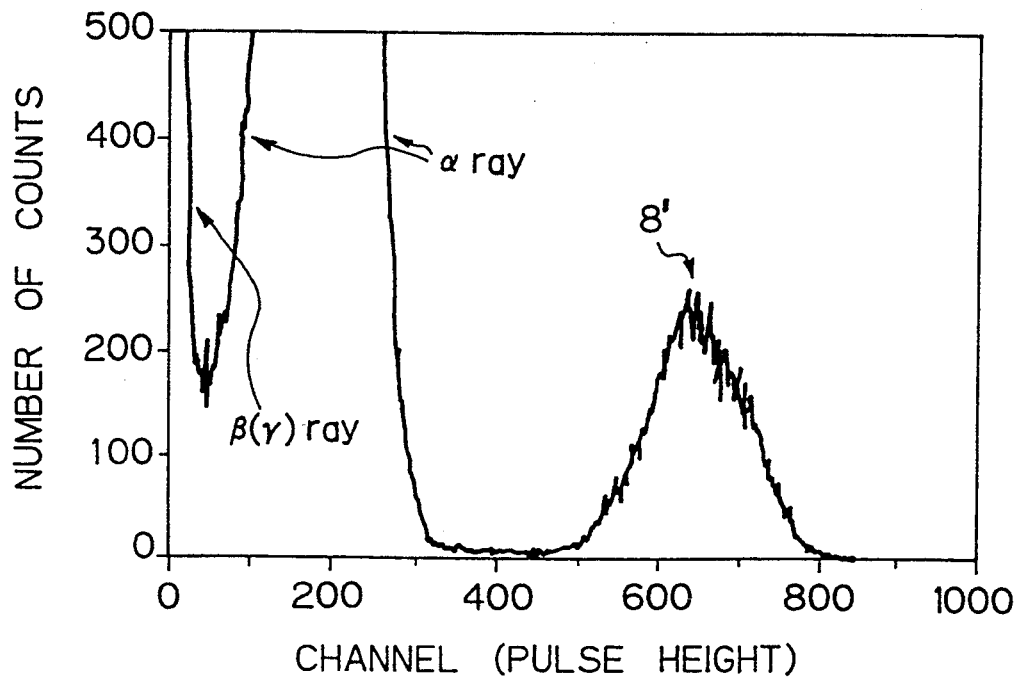
FIG. 4 is a pulse height distribution of $\alpha$-rays from $^{244}$Cm and $\beta(\gamma)$-rays and thermal neutrons from $^{252}$Cf as measured with a phoswich detector.

When the above measurement was carried out using a phoswich detector having two gold-coated Mylar TM film between the two scintillators, since the transmittance of the fluorescence only from the ZnS(Ag) scintillator was reduced, the pulse height of α-rays could be lowered below that of thermal neutrons. In FIG. 4 are shown the results. It is seen that only the thermal neutrons can be discriminated from α-rays in terms of pulse height. In this case, because the peak width of α-rays increased, the pulse height discrimination characteristics between α-rays and thermal neutrons (inclusive of β(γ)-rays) were inferior to those obtained in the case of using no optical filter, but such gave rise to no problem in practical pulse height discrimination.

EXAMPLE 3

Example 3 is to illustrate an experiment in which the rise time of output pulses of α-rays due to a ZnS(Ag) scintillator was delayed by using a phoswich detector having the same scintillators as used in Example 2.

Figure 5:
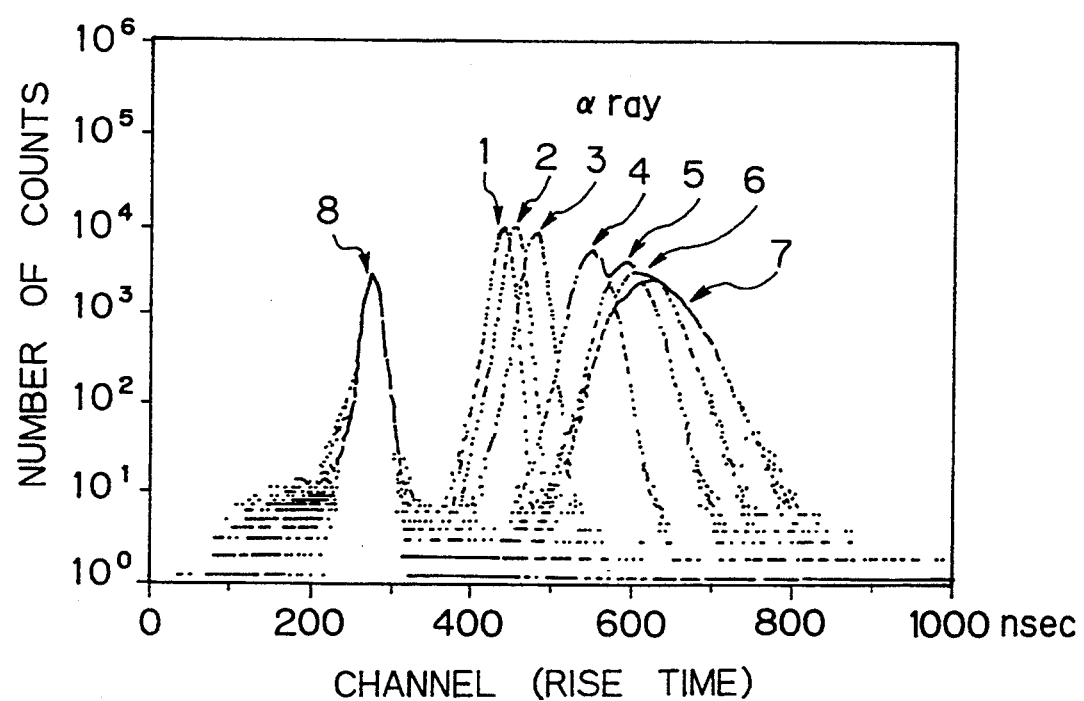
FIG. 5 is rise time distributions of $\alpha$-rays from $^{244}$Cm and those of thermal neutrons from $^{252}$Cf as measured with a phoswich detector.

A sharp-cut filter which cuts only the light of the shorter wavelength side of fluorescence to allow only the light of the longer wavelength side to pass was inserted between a ZnS(Ag) scintillator and a $^6$Li concentrated lithium glass scintillator. In FIG. 5 are shown the rise time distributions obtained with a sharp-cut filter having a threshold transmission wavelength varying from 360 nm to 480 nm being used. In FIG. 5, rise time distribution is 1 to 7 are those of α-rays due to the ZnS(Ag) scintillator combined with a sharp-cut filter having a threshold transmission wavelength of 360 nm, 380 nm, 400 nm, 20 nm, 440 nm, 460 nm, and 480 nm, respectively, and rise time distributions 8 are of thermal neutrons from the $^6$Li concentrated lithium glass scintillator. It is seen that the rise time of the output pulses from the ZnS(Ag) scintillator (the maximum emission wavelength in the emission spectrum: 450 nm) could be delayed.

Although the rise time may be made longer with an increase in the threshold transmission wavelength of the optical filter used, the fluctuation, i.e., the peak width, also increases. In this example, the most effective wave form discrimination was achieved by using a sharp-cut filter having a threshold transmission wavelength of about 440 nm.

While the invention has been described in detail and with reference to specific examples thereof, it will be apparent to one skilled in the art that various changes and modifications can be made therein without departing from the spirit and scope thereof.

What is claimed is:

1. A phoswich detector comprising two or more scintillators, in which an optical filter is provided between two of the scintillators.

2. A phoswich detector as claimed in claim 1, wherein said optical filter functions to reduce the transmittance of scintillation emitted from one of the scintillators.

3. A phoswich detector as claimed in claim 2, wherein said optical filter is an ND filter or a gold-coated polyethylene terephthalate film.

4. A phoswich detector as claimed in claim 1, wherein said optical filter functions to reduce the transmittance of the light in the shorter wavelength side of the scintillation emitted from one of the scintillators.

5. A phoswich detector as claimed in claim 4, wherein said optical filter has a threshold transmission wavelength of from about 360 to 480 nm.

6. A phoswich detector as claimed in claim 4, wherein said optical filter is a sharp-cut filter.

7. A phoswich detector comprising two or more scintillators, at least one optical filter and a photomultiplier, wherein said at least one optical filter is provided between the scintillator farthest from the photomultiplier and the scintillator nearest to the photomultiplier.

8. A phoswich detector as claimed in claim 7, wherein said at least one optical filter constitutes means for reducing the transmittance of the scintillation emitted from the scintillator farthest from the photomultiplier and means for reducing the transmittance of the light in the shorter wavelength side of the scintillation emitted from the scintillator farthest from the photomultiplier.

9. A phoswich detector in accordance with claim 7, wherein said at least one optical filter comprises a means for reducing the transmittance of scintillation emitted from the scintillator farthest from the photomultiplier tube.

10. A phoswich detector according to claim 9, wherein said at least one optical filter is an ND filter or a gold-coated polyethylene terephthalate film.

11. A phoswich detector according to claim 7, wherein said at least one optical filter constitutes means for reducing the transmittance of the light in the shorter wave-length side of the scintillation emitted from the scintillator farthest from the photomultiplier tube.

12. A phoswich detector according to claim 11, wherein said at least one optical filter has a threshold transmission wave-length of from about 360 to 480 nm.

13. A phoswich detector in accordance with claim 11, wherein said at least one optical filter is a sharp-cut filter.

* * * * *